US010479874B1

(12) United States Patent
Amdur

(10) Patent No.: US 10,479,874 B1
(45) Date of Patent: Nov. 19, 2019

(54) LATEX COMPOSITIONS AND ANTISTATIC ARTICLES MANUFACTURED THEREFROM

(71) Applicant: Shimon Amdur, Indianapolis, IN (US)

(72) Inventor: Shimon Amdur, Indianapolis, IN (US)

( * ) Notice: Subject to any disclaimer, the term of this patent is extended or adjusted under 35 U.S.C. 154(b) by 0 days.

(21) Appl. No.: 16/158,672

(22) Filed: Oct. 12, 2018

Related U.S. Application Data

(60) Provisional application No. 62/630,911, filed on Feb. 15, 2018.

(51) Int. Cl.
| | | |
|---|---|---|
| *B29C 41/00* | (2006.01) | |
| *A41D 19/00* | (2006.01) | |
| *C08J 7/12* | (2006.01) | |
| *C08K 3/26* | (2006.01) | |
| *C08K 3/04* | (2006.01) | |
| *C08K 5/3445* | (2006.01) | |
| *B29C 41/14* | (2006.01) | |
| *B29L 31/48* | (2006.01) | |
| *B29K 105/00* | (2006.01) | |
| *B29K 509/02* | (2006.01) | |
| *B29K 33/18* | (2006.01) | |

(52) U.S. Cl.
CPC .......... *C08J 7/126* (2013.01); *A41D 19/0055* (2013.01); *B29C 41/003* (2013.01); *B29C 41/14* (2013.01); *C08K 3/04* (2013.01); *C08K 3/26* (2013.01); *C08K 5/3445* (2013.01); *B29K 2033/18* (2013.01); *B29K 2105/0032* (2013.01); *B29K 2509/02* (2013.01); *B29K 2995/0005* (2013.01); *B29K 2995/0092* (2013.01); *B29L 2031/4864* (2013.01); *C08K 2003/265* (2013.01)

(58) Field of Classification Search
CPC ............................ A41D 19/0055; C08C 19/00
See application file for complete search history.

(56) References Cited

U.S. PATENT DOCUMENTS

| | | | | |
|---|---|---|---|---|
| 3,236,726 A * | 2/1966 | Ross | ........................ | A01N 59/10 162/161 |
| 3,887,527 A * | 6/1975 | Okamura | ................. | C08C 19/28 525/386 |
| 4,143,109 A * | 3/1979 | Stockum | ............. | B29C 37/0067 264/112 |
| 4,316,828 A * | 2/1982 | Makowski | ............... | C08C 19/20 524/372 |
| 4,769,856 A * | 9/1988 | Reed | ........................ | A41D 19/00 2/167 |
| 4,853,441 A * | 8/1989 | Buding | .................... | C08C 19/02 525/339 |
| 5,084,514 A * | 1/1992 | Szczechura | ............. | C08L 13/02 524/559 |
| 5,143,980 A | 9/1992 | Kimura et al. | | |
| 5,242,989 A * | 9/1993 | Bening | ................... | C08C 19/40 525/314 |
| 5,442,815 A * | 8/1995 | Cordova | ................ | A61B 42/10 2/161.7 |
| 5,458,588 A * | 10/1995 | Amdur | .................. | A61L 31/128 2/168 |
| 5,614,202 A * | 3/1997 | DeFina | .............. | A41D 19/0055 424/400 |
| 5,636,382 A * | 6/1997 | Chopko | ............... | A41D 19/001 2/161.7 |
| 5,732,413 A * | 3/1998 | Williams | ............. | A41B 11/005 2/168 |
| 5,877,244 A * | 3/1999 | Hoover | .................... | C08K 3/11 524/322 |
| 5,885,708 A * | 3/1999 | Lu | ......................... | C08F 220/12 428/353 |
| 5,993,839 A * | 11/1999 | Mixon | .................. | A01N 25/34 424/402 |
| 5,997,969 A * | 12/1999 | Gardon | ............. | A41D 19/0055 2/167 |
| 5,998,546 A * | 12/1999 | Li | ....................... | C08F 290/062 525/192 |
| 6,391,409 B1 * | 5/2002 | Yeh | ....................... | B29C 41/003 2/161.7 |
| 6,618,236 B1 * | 9/2003 | Tsuwako | ............ | A41D 19/0058 2/167 |
| 6,673,871 B2 * | 1/2004 | Warneke | ................... | C08K 3/22 525/331.7 |
| 6,794,475 B1 * | 9/2004 | Bialke | ................. | C08F 290/062 525/123 |
| 7,041,367 B2 * | 5/2006 | Janssen | .................. | A61B 42/10 2/161.7 |

(Continued)

FOREIGN PATENT DOCUMENTS

JP          2003321581 A          11/2003

OTHER PUBLICATIONS

H.G.I.M. et al, "Optimization of calcium carbonate (CaCO3) loading in Natural rubber latex based disposable gloves", Int'l Journal of Scientific and Research Publications, V6.
Brooks et al, "Calcium Carbonate and Its Hydrates", Philosophical Transactions of the Royal Society of London, Series A, Mathematical and Physical Sciences vol. 243, No. 861.
Jordan et al, "Heavy metal distribution and electrical conductivity measurements in biosolid pellets", Journal of Soils and Sediments, Apr. 2016, vol. 16, Issue 4, pp. 1176.
Aziz et al, "Electrical and Optical Properties of Azo Dyes", Indian Journal & Applied Physicas, vol. 47, 530-534, Jul. 2009.

(Continued)

*Primary Examiner* — Matthew J Daniels
*Assistant Examiner* — Andrew D Graham

(57) ABSTRACT

A method for making rubber films with improved ESD (electrostatic discharge) property relates to a method for making better ESD gloves using improved rubber composition with a precipitated $CaCO_3$ filler. In addition, non-metallic filled organic pigment such as AZO compounds are suggested to make better ESD gloves. Additionally, other improved method steps such as chlorination and addition of Carbon Black in conjunction with chlorination are suggested to make better ESD gloves.

10 Claims, No Drawings

(56) References Cited

U.S. PATENT DOCUMENTS

| | | | | |
|---|---|---|---|---|
| 7,178,171 | B2* | 2/2007 | Griesbach, III | A41D 19/0058 2/161.7 |
| 7,566,502 | B1* | 7/2009 | Chen | A41D 19/0055 2/168 |
| 7,585,526 | B2* | 9/2009 | Hamann | A61K 8/0208 2/161.7 |
| 7,635,517 | B2* | 12/2009 | Douglas | B82Y 10/00 428/365 |
| 8,187,684 | B2* | 5/2012 | Teoh | B29C 41/003 2/159 |
| 10,064,389 | B2* | 9/2018 | Schuster | A01K 13/002 |
| 10,154,699 | B2* | 12/2018 | Megat Abdul Aziz | A41D 19/001 |
| 10,246,573 | B2* | 4/2019 | Serban | C08L 79/02 |
| 2002/0015812 | A1* | 2/2002 | Littleton | A41D 19/0058 428/36.8 |
| 2002/0077393 | A1* | 6/2002 | Gugumus | C08K 5/005 524/99 |
| 2002/0156159 | A1* | 10/2002 | Amdur | C08J 3/03 523/334 |
| 2004/0010090 | A1* | 1/2004 | Chino | C08F 8/30 525/242 |
| 2004/0091557 | A1* | 5/2004 | Hamann | A61K 8/0208 424/727 |
| 2004/0106744 | A1* | 6/2004 | Chino | C08C 19/22 525/375 |
| 2004/0115379 | A1* | 6/2004 | Conley | C08J 7/065 428/35.7 |
| 2004/0122382 | A1* | 6/2004 | Johnson | A61L 31/10 604/292 |
| 2004/0171765 | A1* | 9/2004 | Tsuji | C08G 18/0895 525/452 |
| 2004/0253459 | A1* | 12/2004 | Triebes | A41D 19/0058 428/447 |
| 2005/0031817 | A1* | 2/2005 | Littleton | A61L 31/048 428/35.7 |
| 2005/0127552 | A1* | 6/2005 | Modha | A61F 6/04 264/129 |
| 2005/0277722 | A1* | 12/2005 | Honeycutt | C08C 1/04 524/437 |
| 2006/0068138 | A1* | 3/2006 | Janssen | A41D 19/0055 428/35.7 |
| 2006/0115653 | A1* | 6/2006 | Soerens | A61L 15/225 428/423.1 |
| 2006/0150300 | A1* | 7/2006 | Hassan | A41D 19/0058 2/161.6 |
| 2006/0199917 | A1* | 9/2006 | Chino | C08F 8/30 525/374 |
| 2006/0253956 | A1* | 11/2006 | Lipinski | A41D 19/0055 2/168 |
| 2008/0051498 | A1* | 2/2008 | Kodama | B29C 41/14 524/394 |
| 2008/0306200 | A1* | 12/2008 | Chen | B29C 41/22 524/418 |
| 2009/0143516 | A1* | 6/2009 | MacDonald | A61B 5/015 524/236 |
| 2009/0192244 | A1* | 7/2009 | Doyle | C08C 1/04 524/17 |
| 2009/0234064 | A1* | 9/2009 | Wang | C08C 1/075 524/552 |
| 2009/0238811 | A1* | 9/2009 | McDaniel | A61L 2/00 424/94.2 |
| 2010/0168230 | A1* | 7/2010 | Nip | A01N 47/14 514/494 |
| 2010/0210745 | A1* | 8/2010 | McDaniel | C09D 5/008 521/55 |
| 2010/0239679 | A1* | 9/2010 | Greene | A01N 25/26 424/490 |
| 2010/0260866 | A1* | 10/2010 | Lu | A01N 25/08 424/618 |
| 2011/0160357 | A1* | 6/2011 | Gerster | C07B 63/04 524/83 |
| 2011/0250626 | A1* | 10/2011 | Williams | A01N 63/02 435/18 |
| 2012/0090075 | A1* | 4/2012 | Piesker | A41D 19/0065 2/168 |
| 2012/0178865 | A1* | 7/2012 | Sun | C08K 3/06 524/418 |
| 2013/0167287 | A1* | 7/2013 | Ueda | A41D 19/0055 2/167 |
| 2013/0191964 | A1* | 8/2013 | Khoo | A41D 19/0055 2/168 |
| 2013/0198933 | A1* | 8/2013 | Khoo | C08L 9/00 2/168 |
| 2014/0142211 | A1* | 5/2014 | Stoever | C08K 3/26 523/105 |
| 2014/0148553 | A1* | 5/2014 | Moncino | C08K 3/346 525/154 |
| 2015/0030869 | A1* | 1/2015 | Preston | C09D 17/004 428/537.5 |
| 2015/0267015 | A1* | 9/2015 | Cornish | C08K 11/005 524/13 |
| 2015/0284584 | A1* | 10/2015 | Holguin | C08F 2/22 524/503 |
| 2015/0342274 | A1* | 12/2015 | Chen | A41D 19/0058 428/141 |
| 2016/0115331 | A1* | 4/2016 | Yazaki | B41M 5/0023 347/100 |
| 2016/0150839 | A1* | 6/2016 | Allen | A41D 19/0024 2/161.6 |
| 2016/0150840 | A1* | 6/2016 | Enomoto | A41D 19/0062 523/334 |
| 2016/0183611 | A1* | 6/2016 | Dangalla | A41D 19/0058 2/168 |
| 2018/0193237 | A1* | 7/2018 | Foo | A61K 8/14 |
| 2018/0312671 | A1* | 11/2018 | Inthasaro | C08L 9/02 |
| 2018/0332910 | A1* | 11/2018 | Modha | A41D 19/0006 |
| 2018/0355074 | A1* | 12/2018 | Kageyama | C08C 19/22 |
| 2019/0031861 | A1* | 1/2019 | Satoh | C08J 3/07 |
| 2019/0031865 | A1* | 1/2019 | Ishii | B29C 41/003 |
| 2019/0055367 | A1* | 2/2019 | Ishiba | B29C 41/14 |
| 2019/0106554 | A1* | 4/2019 | Muthusamy | C08L 9/04 |

OTHER PUBLICATIONS

Polley et al, "Carbon Blacks for Highly Conductive Rubber", Rubber Chemistry and Technology: Mar. 1957, vol. 30, No. 1, pp. 170-179.

Stacy et al, "Chlorine fixation on anthracites and carbon blacks and its effect on electrical resistivity", Pennsylvanian Pergamon Press, 1966, pp. 343-352.

Extrand et al, "Contact Angle and Spectroscopic Studies of Chlorinated and Unchlorinated Natural Rubber Surfaces", Rubber Chemistry and Technology: Sep. 1988, vol. 6, No. 4.

Martin-Martinez et al, "Weak Boundary Layers in Styrene-Butadiene Rubber", Department of Inorganic Chemistry, 03080, Alicante, Spain The Journal of Adhesion vol. 50, 1995.

* cited by examiner

LATEX COMPOSITIONS AND ANTISTATIC ARTICLES MANUFACTURED THEREFROM

The current application claims a priority to the U.S. Provisional Patent application Ser. No. 62/630,911 filed on Feb. 15, 2018.

FIELD OF THE INVENTION

The present invention relates generally to a method for making rubber films with improved ESD (electrostatic discharge) properties. Specifically, the present invention relates to a method for making better ESD gloves using improved rubber composition with a special precipitated $CaCO_3$ filler. In addition, non-metallic organic pigment such as AZO compounds are suggested to make better ESD gloves. Additionally, other improved methods such as chlorination and addition of Carbon Black in conjunction with chlorination are suggested to make better ESD gloves.

BACKGROUND OF THE INVENTION

Many dipped rubber goods are disposable items, for example, gloves. Some gloves are made from natural rubber called "Latex" gloves, some are made from synthetic rubber, called "Nitrile" gloves.

The rubber material is relatively expensive. In order to reduce cost, it is loaded with less expensive fillers. One such example is calcium carbonate, $CaCO_3$.

Various fillers can have different effects on the properties of rubber. Some fillers when added in access, can deteriorate the physical properties of rubber. Excess amount of fillers disturbs the structure of the rubber. When subject to testing, the rubber will break more easily. Some fillers can be beneficial to physical properties of the rubber. Silicon dioxide ($SiO_2$), in miniature particles, called fumed silica, can enhance physical properties, even if added in small amounts. It is not clear how the miniature particles or nanoparticles of fumed silica enhance properties. One possibility is that they are embedded in between the cured rubber particles and act like a glue. Some filler can change the rubber's appearance. For example, titanium oxide ($TiO_2$), which is added to grant the rubber opacity.

Calcium Carbonate ($CaCO_3$) is used in gloves for a long time. It is the most popular glove filler. Rubber filling is continued to be discussed in the literature.

There are a few varieties of $CaCO_3$, mined and manufactured. The most common is mined $CaCO_3$. It is dispersed in water and added to aqueous latex dispersions as such. Another, a more expensive version, is precipitated $CaCO_3$. It is made as follows:

Mining high purity calcium carbonate rock;

Crushing the rocks to the particle size such as small stones or powder and separating some impurities from the crushed rock;

Calcining (heating) in a kiln to 1,000° C., which takes the calcium carbonate apart, forming lime (CaO) and carbon dioxide gas ($CO_2$), where the carbon dioxide can be captured for reuse;

$$CaCO_3 + Heat \rightarrow CaO + CO_2 \uparrow$$

Adding the lime to water to form calcium hydroxide (hydrated lime or slake);

$$CaO + H_2O \rightarrow Ca(OH)_2$$

Separating out additional impurities from the slaked lime; and

Combining the captured carbon dioxide with the slaked lime, where calcium carbonate reforms, and since it is insoluble in water, it precipitates out.

$$Ca(OH)_2 + CO_2 \rightarrow CaCO_3 \downarrow + H_2O$$

Such $CaCO_3$ has many applications, for example in cosmetics and in tooth paste. It can also be dispersed in water and added to the aqueous rubber latex dispersion.

When comparing mined $CaCO_3$ with precipitated $CaCO_3$ as a rubber filler, the mined $CaCO_3$ is the one used regularly in gloves as such. The precipitated $CaCO_3$ is a more expensive, unique product.

Precipitated $CaCO_3$ have been used in rubber in special applications. For example, in surgical gloves which needs sterilization. When standard $CaCO_3$ filled, surgery gloves were sterilized with gamma irradiation, the gloves became discolored. This problem was solved by using the more expensive, precipitated $CaCO_3$. It could stand the gamma rays sterilization. However, the rubber discoloration problem is solved now by sterilization with ethylene oxide gas in sealed chambers and more recently, by using an electron beam radiation sterilization. There is no need for the more expensive precipitated $CaCO_3$ for this application.

For precipitated $CaCO_3$ and electrical conductivity, there is a difference between the electrical properties of mined $CaCO_3$, and precipitate $CaCO_3$. At the time of preparation, described as above, some water molecules join the $CaCO_3$ precipitate crystal. As a result, precipitated $CaCO_3$ is a hydrated material.

As said, precipitated $CaCO_3$ was used before to protect sterilized rubber gloves from gamma radiation. It is possible that such captured water molecules can stop the free radical irradiation damage at its initial stages and prevent further free radical reactions and damage of discoloration to the rubber. Precipitated $CaCO_3$ when used as a filler, adds water molecules to the cured rubber system. Water is a good conductor of electricity. In relation to the invention, the presence of water-containing fillers, in specific, precipitates calcium carbonate, will help rubber gloves to have a better electrostatic discharge (ESD) properties.

For Azo pigments and their electrical properties, most pigments contain heavy metals. Such pigments might cause rubber to be more conductive. However, heavy metals are not desirable in sensitive electrical manufacturing environments. Organic Azo pigments are heavy metal free. Azo molecules contain conjugated double bonds of nitrogen and of carbon and are known to be electrically active. It is discussed that Azo dyes can increase ESD properties. In relation to the invention, adding Azo dyes as a pigment helps to improve ESD properties of latex gloves.

For electrical conductivity, a non-ionic pigment granting rubber to have a better static discharge is carbon black. This is known in the literature.

Carbon Black filling enhances the ESD effect of rubber. In addition, carbon was shown to increase conductivity by reaction with chlorine fixation on anthracites. This is known in the literature, carbon black and its effect on electrical resistivity. In relation to the invention chlorination of carbon black filled rubber glove is helpful to ESD.

For the conductivity of chlorinated rubber films, chlorination by itself will change the structure and properties of rubber. One example is rubber chlorination. Other variations in rubber properties due to chlorination were detected. As a result of chlorination, the properties of the rubber are changed to create more electrically active groups that causes charges to better dissipate.

In relation to the invention, any chemical reaction, changing the structure of rubber, creating more active molecules of oxygen or other hydrophilic substances, in specific chlorination, grants rubber to have a better static discharge, ESD properties. In a summarized relation to the invention, a filler of a precipitate calcium carbonate, combined with a pigment of an organic nonmetal conjugated double bond derivative, specifically an orange Azo pigment having CAS No. 3520-72-7 or a Carbon Black pigment, each of them along with chlorination, will grant such rubber elastomers a better electrostatic discharge (ESD) properties.

Static electricity is a concern when working with sensitive electrical devices, for example semiconductor components. Any spark, small as it may be, might damage such parts. "Antistatic Gloves" or ESD gloves help to resolve such production issues. In addition, safety matters are of concern when dealing with possible explosions in oil and gas deliveries and facilities. Such danger exists where other explosive vapors are present. For example, in medicine production facilities, where alcohol is being used vastly, for sterilization. Sparks can cause an explosion of the alcohol vapors present in the atmosphere of the facility. "Antistatic Gloves" or ESD gloves resolves safety and productivity issues. They allow minor sparks to better travel through the glove to the operator and to the ground, dissipating the danger. In experimental evaluation of ESD properties of rubber films, antistatic properties are evaluated by a variety of testing. It can be evaluated by measuring the surface electrical resistance or resistivity, of the rubber film. The units are Ohm. It can be also evaluated by measuring the resistance of the volume of the rubber film, across the body of the film. The units are Ohms.

Previous studies have shown that a form-fitting glove with improved anti-static discharge and a method of manufacturing the glove with one layer or multi-layered utilizing a standard latex dip line (Piesker and Hansen, 2012); and that an antistatic rubber latex composition which includes carbon black as an antistatic agent and antistatic rubber gloves using the composition are provided (Kishihara and Ozawa, 2003). However, these two patents are directed to a different method of producing antistatic gloves and does not utilize chlorination. Another patent (Tsuwako et al., 2003) provides a handling glove capable of preventing the buildup of static charges and electric charge leakage and states the glove is coated with dissipative material such as nitrile rubber. However, this patent includes a different method of producing the glove, and does not utilize chlorination. Another patent (Kimura et al., 1992) provides a method of producing chlorinated rubber, However, it does not teach the use of the chlorinated rubber to make an antistatic rubber glove. Therefore, there is need to produce an antistatic rubber gloves with an improved electrostatic discharge (ESD) properties by adding various additives combined with chlorination in the process of preparation of rubber gloves.

SUMMARY OF THE INVENTION

The following listing of embodiments is a non-limiting statement of various aspects of the invention. Other aspects and variations will be evident in the light of the entire disclosure.

Some embodiments include a process for making a static dissipative glove, the process comprising:

(a) immersing a glove former in an aqueous coagulant solution including Calcium Stearate (Calcium ion, as in calcium nitrate, is a strong electrolyte, capable of breaking such dispersions as Latex and Nitrile, and depositing the rubber as a uniform thin layer on the former);

The former is then dried leaving a thin layer with the Ca salt on it.

As said, the salt of calcium stearate produces a coated former. The Stearate part of the salt has a relatively long hydrocarbon chain material. While forming the precipitated layer, it covers the inside of the rubber film. This is important to prevent sticking of the rubber gloves after curing. In some cases, the coagulant solution may also contain a polymer to help prevent sticking.

(b) immersing the salt coated former, into a rubber dispersion to coat the former with a film of said rubber, washing it with water to remove various components which are not needed at that stage and curing it in an oven;

(c) chlorinating the rubber coated on said former and washing it with water;

(d) drying the chlorinated rubber on said coated former;

(e) washing and drying again to remove residues of chlorine and removing the finished glove from the former, and optionally (f) chlorinating the gloves after removal.

In one embodiment, the rubber dispersion used in step (b) of the process, is a dispersion of a natural rubber such as latex. In another embodiment, the rubber dispersion used in step (b) of the process is a dispersion of a synthetic rubber such as nitrile rubber. In another embodiment, the rubber dispersion used in step (b) of the process is a dispersion of latex-nitrile rubber combination or petroleum-based cross-linked film. In another embodiment, step (a) of the process contains coating the former with an aqueous medium containing a polymer.

In some embodiments, the chlorination of the rubber occurs in-line. In one embodiment, the chlorination of the rubber occurs in line or off-line, after removing the glove from the former.

In some embodiments, chlorinating the rubber coated on the former in step (c) comprises immersing the former in a solution comprising chlorine and water. In one embodiment, the aqueous chlorine solution contains from 500 to 15,000 ppm of chlorine. In another embodiment, the aqueous chlorine solution contains from 1,000 to 10,000 ppm of chlorine.

In some embodiments, the rubber in step (b) contains a hydrophilic additive. In some embodiments, the rubber in step (b) comprises an additive that enhanced the electrical conductivity of the rubber. In one embodiment, the additive is a hydrophilic filler. In another embodiment, the additive is a mineral additive with hydration molecules that acts as a filler. In another embodiment, the additive is precipitated calcium carbonate hydrate. In another embodiment, the precipitated calcium carbonate hydrate is in the range of 1% to 40% of total composition (rubber+calcium carbonate) by weight. In another embodiment, the precipitated calcium carbonate hydrate is in the range of 10% to 30% of total composition (rubber+calcium carbonate) by weight.

In another embodiment, the additives comprise pigments, stable to chlorination, are being used in combination with precipitated calcium carbonate for demanding static dissipative applications. In another embodiment, the pigments are Azo based non-metallic organic pigments, where the level of Azo pigment is between 0.05% to 8%, preferentially between 0.15% to 4%. In another embodiment, the additives comprise Azo based non-metallic organic pigments that are being used, in conjunction with chlorination and precipitated calcium carbonate filler for sensitive non-ionic environmental kind application. In another embodiment, the Azo based non-metallic organic pigments are orange color and have CAS number 3520-72-7.

In another embodiment, the additive comprises Carbon Black, wherein the level of Carbon Black is between 0.1% to 10%, preferentially between 1% to 5%.

DETAIL DESCRIPTIONS OF THE INVENTION

All examples are for the purpose of describing selected versions of the present invention and are not intended to limit the scope of the present invention. The preferred embodiment of the present invention may be referred to hereinafter as "The Antistatic Gloves" or ESD gloves. The invention serves in increased productivity and enhance safety. Increased productivity is where the use of better ESD gloves in manufacturing, increasing static dissipation, preventing static discharge. The yield of production can be improved. Increased safety, where better ESD gloves can conduct and dissipate minor static sparks, discharge them and prevent explosions. The objective of the invention is to enable better productivity and safety. The present invention has to do with the medium of the rubber which include special fillers and pigments, in conjunction with a chlorination process.

The objective of the present invention is to provide Elastomer articles with better ESD properties. In particular, the invention deals with natural latex gloves (called Latex) and with synthetic nitrile gloves (called Nitrile). It also referred to combination of latex and nitrile, and petroleum-based, cross-linked film. This includes better surface and better volume conductivity. The invention is improving the structure composition of the rubber in various dipped articles and gloves with special fillers, pigments and process. The preferred filler is precipitated calcium carbonate combined with orange color pigment having CAS No. 3520-72-7. The preferred process is chlorination. Another preferred filler is Carbon Black combined with chlorination. In a specific case, a specially filled rubber glove with added chlorination-resisted organic color pigments, are being used in order to distinguish an ESD glove, without heavy metal contamination, for sensitive electronic manufacturing. There are preferred three conditions: filler, pigment and chlorination. Such conditions can work separately or mutually to create a better ESD, elastomer glove.

Example 1. Preparation of a Static Dissipative Nitrile Rubber Glove

A process of making a static dissipative nitrile rubber glove was shown as follows: (a) immersing a glove former in an aqueous coagulant solution and drying it. Such solution can include calcium stearate, a strong but oily electrolyte salt, capable of breaking latex and nitrile dispersions on contact and depositing the rubber as a uniform thin layer on the former. The process produces a coated former, where such oily salt covers the inside of the rubber film to prevent sticking. In some cases, the coagulant solution may also contain a polymer which prevents sticking too;

(b) immersing the coated former into a nitrile rubber dispersion to coat the former with a nitrile rubber film, washing it with water to remove unneeded chemicals and then curing it in an oven;

(c) chlorinating the nitrile rubber coated on the former, the chlorination also makes the surface of the rubber more inert to prevent sticking on removal;

(d) washing the chlorinated nitrile rubber on the coated former with water and drying it in an oven;

(e) removing the finished nitrile glove from the former; and optionally (f) chlorinating the nitrile gloves after removal.

In step (b), an additive of precipitated $CaCO_3$ as a filler, and an orange Azo pigment having CAS No. 3520-72-7 or Carbon Black pigment could be added.

The level of the precipitated calcium carbonate hydrate is in the range of 1% to 40% or preferentially 10% to 30% of total composition by weight.

The Azo pigment is between 0.05% to 8%, preferentially, between 0.15% to 4%.

The level of Carbon Black is between 0.1% to 10%, preferentially between 1% to 5%.

In step (c), an aqueous chlorine solution containing 500 to 15,000 ppm chlorine or 1,000 to 10,000 ppm was used.

Example 2. Preparation of a Static Dissipative Latex Glove

A process of making a static dissipative latex glove was shown as follows: (a) immersing a glove former in an aqueous coagulant solution and drying it. Such solution can include calcium stearate, a strong but oily electrolyte salt, capable of breaking latex and nitrile dispersions on contact and depositing the rubber as a uniform thin layer on the former. The process produces a coated former, where such oily salt covers the inside of the rubber film to prevent sticking. In some cases, the coagulant solution may also contain a polymer which prevents sticking too;

(b) immersing the coated former into a latex dispersion to coat the former with a latex film, washing it with water to remove unneeded chemicals and then curing it in an oven;

(c) chlorinating the latex coated on the former, the chlorination also makes the surface of the rubber more inert to prevent sticking on removal;

(d) washing the chlorinated latex on the coated former and drying it in an oven;

(e) removing the finished latex glove from the former; and optionally (f) chlorinating the latex gloves after removal.

In step (b), an additive of precipitated $CaCO_3$ as a filler, and an orange Azo pigment having CAS No. 3520-72-7 or Carbon Black pigment could be added.

The level of the precipitated calcium carbonate hydrate is in the range of 1% to 40% or preferentially 10% to 30% of total composition by weight.

The Azo pigment is between 0.05% to 8%, preferentially, between 0.15% to 4%.

The level of Carbon Black is between 0.1% to 10%, preferentially between 1% to 5%.

In step (c), an aqueous chlorine solution containing 500 to 15,000 ppm chlorine or 1,000 to 10,000 ppm was used.

Experimental Results

Testing results are presented for surface resistivity and volume resistivity. The testing methods include:

(1) Surface Resistivity

The results for surface resistivity are measured with a conventional resistivity meter. The one used is Monroe Electronic Resistivity Meter, Model 264A. The Monroe Instrument is built with two parallel wires, 5 CM long which are placed 5 CM apart. The range of testing is between 10 in the power of 5 and 10 in the power of 12 ohms. It is designated (10 e+5) to (10 e+12) Ohms.

The tester measures in a span unit of 5, 6, 7, 8, 9, 10, 11 and 12 "e" values. The smaller is the e value, the better is the static dissipation. 0.1 mm thick rubber film is placed on a flat surface. The tester is placed on the rubber film and tested at 50+/−5% relative humidity. The surface resistance is measured in Ohms units.

(2) Volume Resistivity

The testing for volume resistivity is made by an equipment, built from a 1507 FLUKA tester and an 850 ETS surface resistant probe. 0.1 mm thick rubber film is laid on an aluminum foil on a flat surface. The ETS probe is placed on it. Two electrodes are used. One is connected to the foil and one to the Fluka tester through the ETS probe. 500 DC volts are applied, and the resistance is measured with the Fluka Tester, at 50%+/−5 relative humidity. The volume resistance is measured in Ohms units, across the film, from side to side.

(3) ANSI ESD S20.20 Resistivity Test

ANSI ESD S20.20 is a testing procedure, designed by the ESD association, used in the industry. This testing of resistivity, is measured in Ohms and made at 25+/−2% relative humidity. We did not measure according to the ANSI ESD 520.20 protocol, only submitted to an outside lab. In order to pass the ANSI ESD S20.20 test, resistivity has to be less than 10 e+9 Ohms.

Obviously measuring at 25% relative humidity overnight, dries the rubber and increases the resistivity a lot. It is therefore a very difficult test to pass but gives a good tool to distinguish between gloves.

Kind of Gloves Tested

Two kinds of gloves, a natural rubber, called "Latex" and synthetic NBR Rubber called "Nitrile" were used. In general, Nitrile gloves are more antistatic than natural Latex, it has a better ESD values. The natural Latex is built mostly of hydrocarbons which is an insulating material. It is difficult to make an ESD glove from Latex. The synthetic Nitrile is also a hydrocarbon material, but it has an electrical active chemical component, called acrylonitrile. The acrylonitrile section has nitrile groups which are relatively more conductive and gives this kind of rubber its name, Nitrile rubber. As a result, Nitrile rubber is known to be more antistatic than Latex and in general has lower e values, which indicates better ESD, antistatic properties.

The improved nitrile and latex gloves, made with a filler of a precipitate calcium carbonate, combined with a pigment of an organic Azo compound having CAS No. 3520-72-7 pigment or a Carbon Black pigment, each of them along with chlorination, will grant such rubber elastomers a better electrostatic discharge (ESD) properties (See Tables 1-14).

Experimental Result

As seen in the Tables below, in both elastomers, Latex and Nitrile, the precipitated $CaCO_3$ filler, the two pigments AZO and Carbon Black and a chlorination treatment, helps to reduce surface and volume resistivity and make them a better ESD gloves.

For nitrile rubber gloves, the combination of precipitated $CaCO_3$ filler, orange Azo pigmentation and chlorination gave the best ESD properties. Such gloves were capable to pass the ANSI/ESD S20.20 STM test.

Table 1. Evaluation of surface resistivity, in Ohms of various commercial Nitrile Glove types A, B and C, compared with Glove D, filled with precipitated $CaCO_3$, pigmented with an orange Azo pigment and subjected to chlorination.

Nitrile Glove A 1.0 e+10
Nitrile Glove B 1.0 e+10
Nitrile Glove C 1.0 e+09
Nitrile Glove D 1.0 e+08

The lower the e value, the better the ESD property of the glove is.

Table 2. Evaluation of volume resistivity in Ohms of various commercial Nitrile Glove types A, B, C, compared with Glove D filled with precipitated $CaCO_3$, pigmented with an orange Azo pigment and subjected to chlorination.

Nitrile Glove A 3,500,000
Nitrile Glove B 1,500,000
Nitrile Glove C 1,000,000
Nitrile Glove D 100,000

Table 3. Evaluation of surface resistivity in Ohms of Nitrile Gloves, non-pigmented and pigmented with orange Azo pigment having CAS No. 3520-72-7.

Nitrile Gloves, non-pigmented 1.0 e+10
Nitrile Gloves, pigmented 1.0 e+09

Table 4. Evaluation of volume resistivity in Ohms of Nitrile Gloves, non-pigmented and pigmented with orange Azo pigment having CAS No. 3520-72-7.

Nitrile Glove, non-pigmented 1,000,000
Nitrile Glove, pigmented 600,000

Table 5. Evaluation of surface resistivity in Ohms of Nitrile Gloves, filled with a precipitated $CaCO_3$ and subjected to a chlorination process.

Nitrile Glove, non-chlorinated 1.0 e+09
Nitrile Gloves, chlorinated 1.0 e+08

Table 6. Evaluation of volume resistivity in Ohms of Nitrile Gloves, filled with precipitated $CaCO_3$ filler and subjected to a chlorination process.

Nitrile Glove, non-chlorinated 350,000
Nitrile Gloves, chlorinated 100,000

Table 7. Evaluation of surface resistivity in Ohms of Latex Gloves, filled with a mined $CaCO_3$ filler and filled with a precipitated $CaCO_3$ filler.

Latex Glove, filled with mined $CaCO_3$ 1.0 e+12
Latex Gloves, filled with precipitated $CaCO_3$ 1.0 e+10

Table 8. Evaluation of volume resistivity in Ohms of Latex Gloves, filled with mined filler and with a precipitated $CaCO_3$ filler.

Latex Glove filled with mined $CaCO_3$ 30,000,000
Latex Gloves filled with Precipitated $CaCO_3$ 900,000

Table 9. Evaluation of surface resistivity in Ohms of Latex Gloves with an orange pigment (CAS No. 3520-72-7 pigment), filled and not filled with precipitated $CaCO_3$ filler.

Latex Gloves, not filled 1.0 e+10
Latex Gloves, filled 1.0 e+09

Table 10. Evaluation of volume resistivity in Ohms of Latex Gloves with an orange pigment (CAS No. 3520-72-7 pigment), filled and not filled with precipitated $CaCO_3$ filler.

Latex Gloves, not filled 900,000
Latex Gloves, filled

Table 11. Evaluation of surface resistivity in Ohms of Latex Gloves with and without Carbon Black pigment.

Latex Gloves, non-pigmented 1.0 e+12
Latex Gloves, Carbon Black pigmented 1.0 e+11

Table 12. Evaluation of volume resistivity in Ohms of Latex Gloves with and without Carbon Black pigment.

Latex Gloves, non-pigmented 590,000
Latex Gloves, Carbon Black pigmented 260,000

Table 13. Evaluation of surface resistivity in Ohms of Nitrile Gloves, pigmented with Carbon Black, and non-chlorinated or chlorinated.

Nitrile Gloves, non-chlorinated, 1.0 e+10
Nitrile Gloves, chlorinated 1.0 e+09

Table 14. Evaluation of volume resistivity in Ohms of Nitrile Gloves, pigmented with Carbon Black and non-chlorinated or chlorinated.

Nitrile Glove, non-chlorinated 33,000
Nitrile Glove, chlorinated 1,300

As seen in the Tables, the precipitated $CaCO_3$ filler, pigments as orange Azo and Carbon Black pigment with added chlorination step, helps to reduce surface and volume resistivity, making a better ESD gloves.

For using the invention in the industry, ESD type gloves are used in electronic or semi-conductor manufacturing, where sparks can damage the products. Such gloves are also used where vapors prone to combustion and flammable liquids are present. For example, in oil and gas facilities. They are also used in medicine production, where sterilization is performed by alcohol, resulting with vast amounts of vapors presence in the atmosphere.

As used herein, "a" or "an" means one or more (or at least one).

Although the invention has been explained in relation to its preferred embodiment, it is to be understood that many other possible modifications and variations can be made without departing from the spirit and scope of the invention.

REFERENCES

Kimura, I; Nobori, K and Hikasa "Methods of producing chlorinated rubber" U.S. Pat. No. 5,143,980 (1992)
Kishihara, H. and Ozawa, Y. "Antistatic rubber latex composition and antistatic rubber glove" JP2003321581A.
Piesker, A. B. and Hansen, C. "Chemical resistant mechanical resistant, anti-static glove". U.S. 2012/0090075 A1
Tsuwako, K.; Sasao; Y. Yamaguchi, K. and Yamamoto, H., Magnetic head handling glove" U.S. Pat. No. 6,618,236 B1 (2003).

What is claimed is:

1. A process for making a static dissipative glove comprising:
   immersing a glove former in an aqueous coagulant solution to produce a coagulant coated former via a calcium salt;
   immersing the coagulant coated former into a rubber dispersion to coat the coagulant coated former with a rubber;
   washing the rubber coated on the coagulant coated former with water;
   curing the rubber coated on the coagulant coated former in an oven;
   chlorinating the rubber coated on the coagulant coated former by immersing the rubber coated on the coagulant coated former in an aqueous chlorine solution;
   washing the rubber coated on the coagulant coated former with water;
   drying the rubber coated on the coagulant coated former;
   obtaining a glove by removing the rubber from the coagulant coated former; and
   chlorinating the glove,
   wherein the rubber dispersion comprises an additive, the additive comprises a precipitated calcium carbonate hydrate and an Azo based non-metallic organic pigment, the precipitated calcium carbonate hydrate is in the range of 5% to 30% of total composition by weight, the Azo based non-metallic organic pigment is in the range of 0.1% to 4% of total composition by weight, the aqueous chlorine solution comprises chlorine from 1,000 to 10,000 ppm, and the Azo based non-metallic organic pigment being orange color and having CAS number 3520-72-7.

2. The process of claim 1 comprising:
the aqueous coagulant solution comprising a polymer composition.

3. The process of claim 1 comprising:
chlorinating the rubber coated on the coagulant coated former being occurred in-line; and
chlorinating the glove being occurred off-line.

4. The process of claim 1 comprising:
the rubber dispersion comprising a hydrophilic additive.

5. The process of claim 1 comprising:
the rubber dispersion comprising a hydrophilic filler.

6. The process of claim 1 comprising:
the additive being used for enhancing electrical conductivity.

7. The process of claim 6 comprising:
the additive comprising a mineral additive with hydration molecules that acts as a filler.

8. The process of claim 1 comprising:
the rubber dispersion being latex.

9. The process of claim 1 comprising:
the rubber dispersion being nitrile rubber.

10. The process of claim 1 comprising:
the rubber dispersion being a combination of latex and nitrile rubber.

* * * * *

UNITED STATES PATENT AND TRADEMARK OFFICE
CERTIFICATE OF CORRECTION

PATENT NO. : 10,479,874 B1  Page 1 of 1
APPLICATION NO. : 16/158672
DATED : November 19, 2019
INVENTOR(S) : Shimon Amdur It is certified that error appears in the above-identified patent and that said Letters Patent is hereby corrected as shown below:

In the Specification

Column 8, Line 54, which reads:
"Latex Gloves, filled"
Should read:
--Latex Gloves, filled 270,000--

Signed and Sealed this
Thirty-first Day of December, 2019

Andrei Iancu
*Director of the United States Patent and Trademark Office*